United States Patent [19]

Peppers et al.

[11] Patent Number: 4,790,024

[45] Date of Patent: Dec. 6, 1988

[54] VECTOR DISCRIMINATION APPARATUS

[75] Inventors: Norman A. Peppers, Belmont; James R. Young, Palo Alto; Gerald A. Pierce, Redwood City, all of Calif.

[73] Assignee: Nippon Sheet Glass Co., Ltd., Osaka, Japan

[21] Appl. No.: 38,632

[22] Filed: Apr. 14, 1987

[51] Int. Cl.$^4$ .............................................. G06K 9/74
[52] U.S. Cl. ..................................... 382/32; 382/31
[58] Field of Search ............... 382/31, 32; 350/162.13, 350/376; 356/389; 367/64

[56] References Cited

U.S. PATENT DOCUMENTS

| | | | |
|---|---|---|---|
| 3,034,127 | 5/1962 | Walling et al. | 367/64 |
| 3,252,140 | 5/1966 | Lemay et al. | 382/32 |
| 3,461,301 | 8/1969 | Fitzmaurice et al. | 382/32 |
| 3,474,404 | 10/1969 | Silverman | 367/64 |
| 3,550,119 | 12/1970 | Rabinow | 382/32 |
| 3,678,454 | 7/1972 | Farr et al. | 367/64 |
| 3,965,299 | 6/1976 | Lin | 350/376 |
| 4,573,198 | 2/1986 | Anderson | 350/162.13 |
| 4,637,055 | 1/1987 | Taylor | 382/31 |

OTHER PUBLICATIONS

Hirsch et al., "Character Reader," IBM Technical Disclosure Bulletin, vol. 14, No. 9, Feb. 1972, p. 2590.
Craig et al., "Bubble Domain Electronic-to-Optical Image Transducer," IBM Tech. Disclosure Bulletin, vol. 13, No. 1, Jun. 1970, pp. 147-148.

Primary Examiner—Leo H. Boudreau
Assistant Examiner—Donald J. Daley
Attorney, Agent, or Firm—Woodcock Washburn Kurtz Mackiewicz & Norris

[57] ABSTRACT

In a vector discrimination apparatus for performing discrimination such as class classification and recognition of a vector consisting of vector components corresponding to features of predetermined information, an optical pattern displayed on a display at a position corresponding to the size of the vector component is optically multiplied by a multiplier to form multiple images each having a substantially identical shape in the vicinities of various types of reference masks, and pattern matching is established between the multiple images and the various types of reference patterns formed on the reference masks. Discrimination such as class classification and recognition of the vector consisting of the vector components corresponding to the features of predetermined information such as a character or the like can be performed at a high speed, although the apparatus configuration is simple and low cost.

7 Claims, 2 Drawing Sheets

VECTOR DISCRIMINATION APPARATUS

BACKGROUND OF THE INVENTION

1. Field of the Invention

The present invention relates to a vector discrimination apparatus, for performing discrimination such as class classification and recognition of vectors consisting of a single or plurality of vector components corresponding to features of predetermined information such as an image (e.g., a character or any other figure), various pieces of voice information, and technical information to be retrieved, and for performing discrimination such as class classification and recognition of the image, voice, and technical information to be retrieved.

2. Description of the Prior Art

A conventional image recognition apparatus for recognizing an image such as a character or any other figure is designed to perform digital processing utilizing primarily electronic techniques. Best matching between data corresponding to the feature of the image to be recognized and corresponding pieces of reference data stored in a data base is obtained by correlation calculations.

However, in case character recognition in which an image to be recognized is, for example, a character image, even if printed characters having a predetermined form are recognized, Japanese hiragana characters are not suitably recognized automatically by an image recognition apparatus since they include many curved portions. On the other hand, Chinese characters have a large number of strokes and are complicated. In addition, the kinds of characters are several thousands, and the printed characters include many styles such as a Gothic type and a Ming type. Handwritten characters have various styles depending on writers. In any case, the operation of the image recognition apparatus is very complicated. It is very difficult to improve recognition precision while the operation speed is kept at a high speed.

A large number of existing characters include similar characters and characters whose parts are very similar to each other or the same. It is thus possible to classify the characters into a plurality of classes.

In the image recognition apparatus, features of an image to be recognized are extracted by projection or the like, and the extracted projection features are compared with those of a reference pattern for class classification, thereby classifying the characters into classes. The class-classified images are then correlated with a large number of images belonging to an identical class according to correlation calculations. The image can be specified, i.e., recognized. In the above correlation calculation process, the projection features of an image to be recognized are compared with those of a large number of image recognition reference patterns (standard patterns). The large number of standard patterns are ordered according to the degree of similarity to the image to be recognized. The image of interest is then specified by this ordering.

A conventional image recognition apparatus designed to perform digital processing utilizing primarily electronic techniques will be described in more detail below. An image pattern subjected to image recognition and written on an original by printing or the like is focused by an optical lens on a light-receiving surface of an image sensor comprising a CCD or a MOS sensor. A multi-value digital signal as image information is output from the image sensor and is binarized by a proper threshold value (if there are a plurality of threshold values, multi-value conversion different from that described above is performed). The binarized signal is stored in a memory. The binarized image information is subjected to preprocessing for shaping the image, as needed. The preprocessed image information is stored in the above memory or another memory. Preprocessing includes noise reduction processing and normalization processing for positions, sizes, inclinations, and widths.

A projection feature required for discriminating an image is extracted by a projection-processing section from the image information stored in the memory.

In order to project an image on a given axis (e.g., the X-axis), the memory which stores the image information is scanned in a direction (e.g., the Y-axis) having a predetermined relationship with the given axis, and the image information is read out in time series or simultaneous time series. The readout image information is transferred to the projection-processing section. Pieces of the transferred image information are sequentially accumulated. Accumulated values sequentially obtained by such accumulations are stored at predetermined positions corresponding to the given axis in the memory or in another memory. A curve of an intensity distribution obtained by extracting projection features on the given axis is calculated on the basis of the stored accumulated values.

The projection features of the image are normally extracted on a plurality of given axes, and thus a plurality of intensity distribution curves can be obtained for identical image information. The plurality of projection features of the image which are represented by these intensity distribution curves are compared with projection features of a prestored standard pattern, thereby classifying the image into classes or recognizing the image.

In order to digitally process the projection features described above, the accumulated values as input data are regarded as one vector component. One or a plurality of intensity distributions is dealt as one vector having a large number of vector components. Therefore, if the accumulated values for the intensity distribution are stored at addresses 1 to n, this intensity distribution constitutes an n-dimensional vector.

In the image recognition apparatus described above, in order to increase an image recognition rate, projection processing must be performed for the same image information on a large number of axes to extract various types of projection features. Therefore, the image to be recognized is dealt as a set of a large number of multidimensional vectors.

The reference pattern for class classification and image recognition is transformed into vector in the same manner as described above. Vector calculators practically used in a parallel pipeline type computer calculate correlations for each vector component between a large number of reference pattern vectors and the vector corresponding to the features of the image to be recognized.

In the correlation calculations, for example, a distance between two vectors, a correlation coefficient, or the degree of similarity is calculated as a factor representing the degree of correlation. In order to determine the degree of correlation, an optimal correlation must be found in consideration of variations in features such as projection features or the like. In practice, correlation calculations between a large number of vectors are repeated according to time-serial digital processing.

In the conventional image recognition apparatus described above, a large number of reference patterns for class classification or image recognition must be previously transformed into vectors. In addition, the correlation calculations between a large number of reference pattern vectors and the vector corresponding to the features of the image to be recognized must be performed by the above vector calculators according to time-serial digital processing for each vector component.

A long processing time is required for the vector transform and correlation calculations. The vector calculator must incorporate a exclusive processor using a exclusive LSI, and the system configuration is complicated, thus increasing cost.

SUMMARY OF THE INVENTION

It is, therefore, a principal object of the present invention to provide a vector discrimination apparatus wherein optical simultaneous processing is used to discriminate a vector consisting of a single or a plurality of vector components corresponding to features of predetermined information such as a character or the like, and thus the vector can be discriminated with a simple arrangement at a high speed.

According to the present invention, there is provided a vector discrimination apparatus for performing discrimination such as class classification and character recognition of a vector consisting of a a plurality of vector components corresponding to features of predetermined information such as an image (e.g., a character or any other figure), various kinds of voice, and technical information to be retrieved.

The vector discrimination apparatus comprises a display in which a plurality of displaying areas are respectively assigned in correspondence with the plurality of vector components on a screen. The display respectively displays a predetermined plurality of line-like or spot-like optical patterns at positions proportional to the rated value of each of the vector components in the plurality of displaying areas.

The apparatus further comprises various types of reference masks in which a plurality of areas are respectively assigned in one-to-one correspondence with the plurality of displaying areas of the display. Each of the various types of reference masks includes a plurality of line-like or spot-like reference patterns respectively being formed by a gray scale in accordance with the plurality of opitcal patterns in the said plurality of displaying areas such that the pluality of reference patterns are matched with the predetermined plurality of optical patterns.

The apparatus further comprises a multiplier for optically multiplying the predetermined optical patterns displayed on the display and for forming a plurality of pattern images each having a substantially identical shape in the vicinities of the various types of reference masks and light detecting means for detecting beams guided respectively through the various types of reference mask by matching the pattern image with the reference pattern.

In the vector discrimination apparatus having the arrangement described above according to the present invention, after the predetermined pattern image is displayed on the display at a position corresponding to the size of the vector component, multiplication, pattern matching, and light detection of the pattern image are simultaneously performed at a light propagation speed.

In the vector discrimination apparatus according to the present invention, vector discrimination such as class classification or recognition of a vector consisting of a single or a plurality of vector components corresponding to the features of the predetermined information can be performed at a high speed although the apparatus configuration is simolel, and low cost.

DETAILED DESCRIPTION OF THE PREFERRED EMBODIMENTS

Preferred embodiments will be described with reference to the accompanying drawings in which the present invention is applied to image recognition apparatuses.

Figure 1:
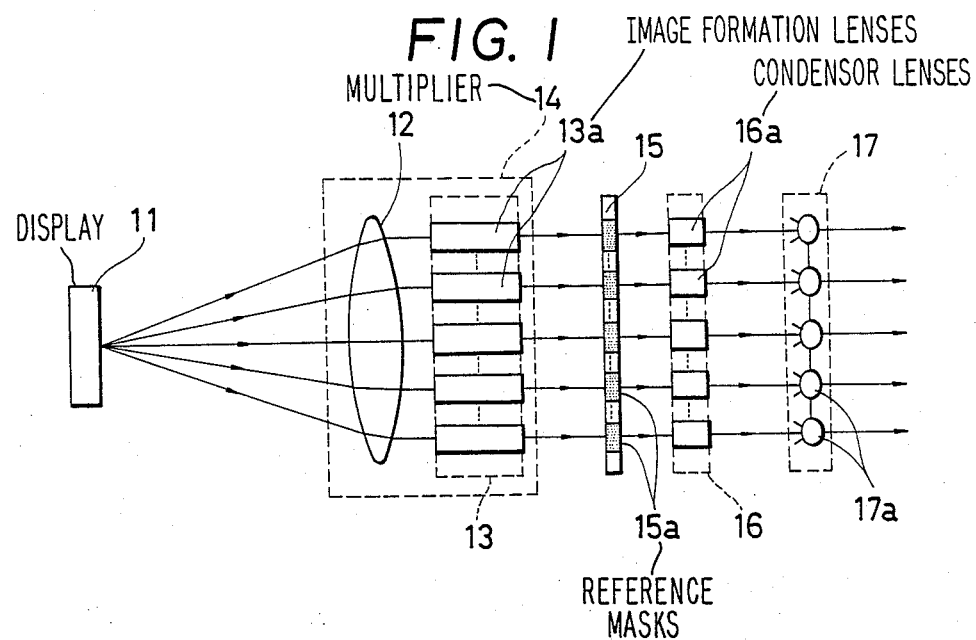
FIG. 1 a schematic view showing an embodiment wherein the present invention is applied to an image recognition apparatus.
Figure 2:
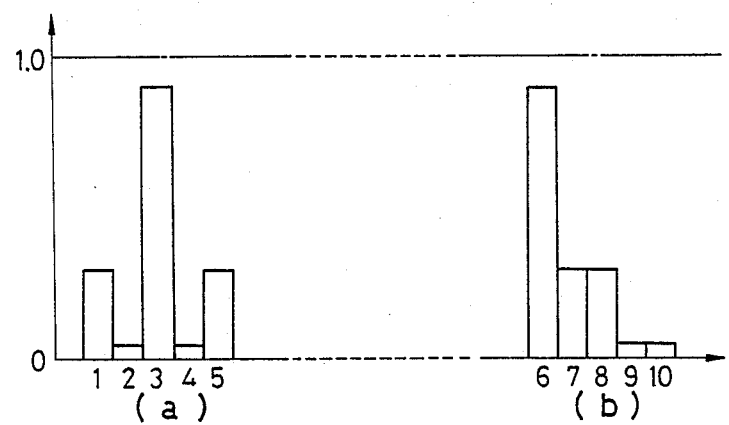
FIG. 2 is a graph showing intensity distribution curves which are obtained upon projection of the image on the X- axis and Y-axes and which are used in the apparatus of FIG. 1.
Figure 3:
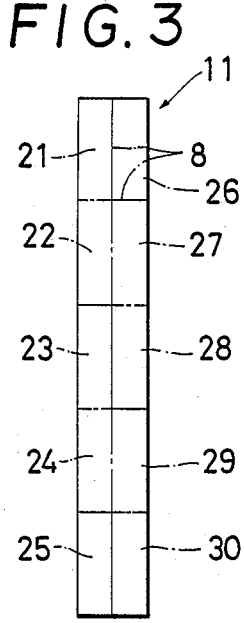
FIG. 3 is a front view of a display shown in FIG. 1 so as to display display areas respectively assigned to the vector components corresponding to the pieces of projection data of the intensity distributions shown in FIG. 2.

FIGS. 1 to 5 show an embodiment of the present invention. A vector including the vector components corresponding to features such as projection features or the like extracted from an image to be recognized is obtained by the same method as in the aforementioned conventional image recognition apparatus or by an arbitrary method. FIG. 2 shows an X-axis projection intensity distribution curve (a) and a Y-axis projection intensity distribution curve (b), both of which are obtained by extracting the features from Chinese character "上". In this case, the vector corresponding to the projection features of Chinese character "上" consists of five vector components 1 to 5 corresponding to the X-axis projection data and five vector components 6 to 10 corresponding to the Y-axis projection data. These ten vector components are displayed as bright line patterns on the display 11.

Figure 4:
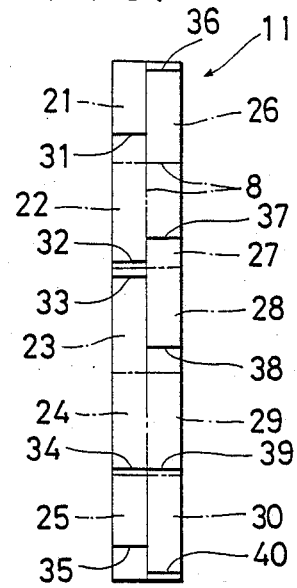
FIG. 4 is a front view of the display of FIG. 1, showing a state wherein a bright line pattern representing the features of Chinese character "上" is formed.
Figure 5:
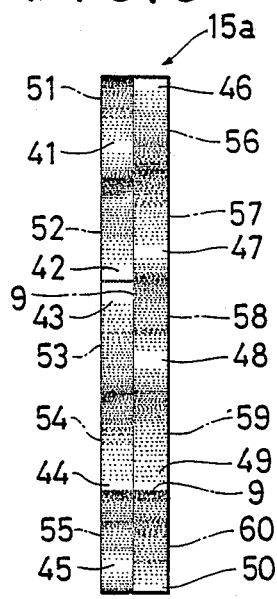
FIG. 5 is a front view of a reference mask (FIG. 1) having a reference pattern corresponding to the bright line pattern showing the features of Chinese character "上"

Vertices of the intensity distribution curves (a) and (b) in FIG. 2, which are obtained by X- and Y-axis projection, are displayed as a large number of bright line patterns on the display 11 of FIG. 1. For this reason, the display screen of the display 11 are respectively assigned to the predetermined number of rectangular areas 21 to 30 corresponding to the vector components 1 to 10, as indicated by imaginary chain lines 8 in FIGS. 3 and 4. As shown in FIG. 4, the vector components are respectively displayed as bright lines 31 to 40 at level positions proportional to the size of the vectors in the areas 21 to 30. FIG. 4 shows a state wherein projection data 1 to 10 of Chinese character "止" shown in FIG. 2 are displayed on the display 11. The projection data 1 to 10 are transformed into a 10-dimensional vector. The relative size, i.e., rating values, of the vector components 1 to 10 are shown in the following table. The vector components 1 to 10 are displayed as the bright lines 31 to 40 at positions corresponding to the rating values in the areas 21 to 30 in the display 11, the areas 21 to 30 being designed to correspond to numbers 1 to 10 of the vector components.

| Projection Data No. | Rating Value of Vector Component |
| --- | --- |
| 1 | 0.3 |
| 2 | 0.05 |
| 3 | 0.9 |
| 4 | 0.05 |
| 5 | 0.3 |
| 6 | 0.9 |
| 7 | 0.3 |
| 8 | 0.3 |
| 9 | 0.05 |
| 10 | 0.05 |

The vector discrimination apparatus shown in FIG. 1 will be described in more detail. A projection lens 12 is spaced apart from the front surface of the display 11 by a focal length of the projection lens 12. Beams from the bright line patterns 31 to 40 displayed on the display screen of the display 11 are collimated by the projection lens 12. The collimated beams are guided to a mask array 15 through a first lens array 13.

The mask array 15 comprises a large number of reference masks 15a substantially located on a single plane. The first lens array 13 comprises image formation lenses 13a at positions respectively corresponding to the reference masks 15a. The first lens array 13 may comprise a planar microlens obtained by locating microlenses (e.g., gradient index lenses) in a flat plate made of glass or a synthetic resin. The number of microlenses is the same as that of the reference masks 15a. An SLA (tradename) available from Nippon Sheet Glass Co., Ltd. may be used as the lens array 13. The SLA is obtained by bundling cylindrical gradient index lenses, the number of which is the same as that of the reference masks 15a. When the SLA is used, a resin is filled between the cylindrical gradient index lenses such that they are located at positions corresponding to the image formation lenses 13a.

The projection lens 12 and the lens array 13 constitute the multiplier 14. The bright line patterns 31 to 41 displayed on the display screen of the display 11 and guided on the first lens array 13 through the projection lens 12 are simultaneously and respectively formed on the reference masks 15a of the mask array 15 by the image formation lenses 13a of the lens array 13. The reference masks 15a are respectively assigned to the predetermined number of areas 51 to 60 corresponding to the areas 21 to 30 of the display 11, as indicated by the imaginary chain lines 9 in FIG. 5. Reference patterns 41 to 50 having the same lightness polarity as that of the bright line patterns 31 to 40 are formed in the areas 51 to 60, respectively. The areas 51 to 60 of the reference mask 15a may have the same size as or similar figures having different size from that of the areas 21 to 30 of the display 11. In any events, it is essential that the areas 21 to 30 of the display 11 are focused by the multiplier 14 in the areas 51 to 60 of the reference mask 15a in one-to-one correspondence.

Various kinds of reference masks 15a, the number of which corresponds to the number required for discrimination operations such as class classification and recognition, are used in this apparatus. In the arrangement of FIG. 1, a large number of independent reference masks 15a are separated from each other. Reference patterns for a large number of reference masks 15a may be formed on a common mask substrate to constitute a large number of reference masks 15a. The reference masks 15a shown in FIG. 5 respectively have the reference patterns 41 to 50 corresponding to the bright line patterns 31 to 40 of Chinese character "止" shown in FIG. 4 and are used to recognize Chinese character "止".

The reference patterns 41 to 50 of the reference masks 15a serve as a gray scale because the concept of so-called "blurring" is introduced. A character to be discriminated has many styles in a printed one and a positional error often occurs in the case of a handwritten Chinese character. Unless the reference patterns 41 to 50 of the reference masks 15a serve as the gray scale, it is difficult to establish pattern matching between the bright line patterns 31 to 40 corresponding to the character to be discriminated and the reference patterns 41 to 50 of the reference masks 15a corresponding to the character. However, in this embodiment, since the reference patterns constitute the gray scale, pattern matching adaptive for styles of characters and positional errors to some extent can be performed.

The bright line patterns 31 to 40 displayed on the display 11 are focused on various types of reference masks 15a by the multiplier 14, respectively. In this case, image formation is performed such that one-to-one correspondence between the areas 21 to 30 of the display 11 and the areas 51 to 60 of the reference mask 15a is established. The beams passing through the reference masks 15a are focused by a large number of condenser lens 16a of a second lens array 16, which are located in one-to-one correspondence with the reference masks 15a. The focused beams are then guided onto a photosensor array 17. The second lens array 16 may be a planar microlens or an SLA having the same arrangement as that of the first lens array 13.

The photosensor array 17 comprises a large number of photosensors 17a arranged in one-to-one correspondence with the condenser lenses 16a and located in the vicinities of the condensing points of the condenser lenses 16a. The beams passing through the reference masks 15a are focused by the condenser lenses 16a, and the intensities of these beams are detected by the photosensors 17a, respectively. In this case, when the reference mask 15a passes the beam of which the intensity detected by the photosensor 17a is closer to the rated intensity, the reference patterns 41 to 50 of the reference mask 15a match better with the bright line patterns 31 to 40 of the image to be discriminated.

Outputs from the photosensors 17a are rated for each reference mask 15a according to the maximum intensity of the beam passing through the reference masks 15a in order to make image discrimination easy. The levels of the rated outputs are compared with each other in a maximum value detector (not shown), and the reference mask 15a giving the maximum output is discriminated. By this discrimination result, class classification or recognition of the image to be discriminated is performed. A peak detector may be additionally arranged in the maximum value detector, and only sensor output levels exceeding a threshold value of the peak detector may be compared to reduce the number of sensor outputs to be compared.

In the vector discrimination apparatus having the above arrangement, after the bright line patterns 31 to 40 obtained by representing the projection data as vector components are displayed, multiplication of the bright line patterns, optical matching between the multiplied bright line patterns and the reference patterns 41 to 50 of the various types of reference masks 15a, and condensing of the beams passing through the reference mask 15a by means of the condenser lens 16a can be performed at a light propagation speed. The condensed beams can be simultaneously detected by the large number of photosensors 17a in short response time. Therefore, pattern matching between the bright line patterns (i.e., unknown patterns) representing the features of the character to be discriminated and the reference patterns (i.e., known patterns) of the reference masks allows simultaneous, high-speed correlation calculations.

Having described illustrative embodiments of the invention with reference to the accompanying drawings, it is to be understood that the invention is not limited to such precise embodiments, and that various changes and modifications may be effected therein by one skilled in the art without departing from the scope and spirit of the invention as defined in the appended claims, as described below.

Figure 6:
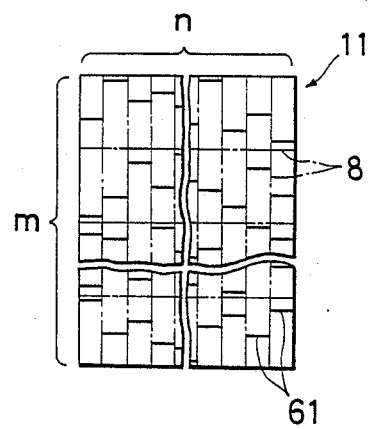
FIG. 6 is a partially cutaway front view of the display of FIG. 1 so as to correspond to FIG. 4 according to another embodiment of the present invention.

In the above embodiment, the number of vector components is $5 \times 2$. However, in general, the number of vector components may be $m \times n$ (where m and n each is an integer of 1 or more). In this case, as shown in FIG. 6, $m \times n$ bright line patterns are formed on the display 11, so that the bright line patterns consist of a set of n m-dimensional vectors. In this case, $n=1$ and $m=1$ may be established. The bright line patterns correspond to a one-dimensional vector for $n=1$ and $m=1$.

The reference masks 15a used in the above embodiment may have reference patterns 41 to 50 of a predetermined shape which is not changed to another shape. Alternatively, the reference patterns may be constituted by spatial modulation elements. In this case, the spatial modulation elements using a liquid crystal as a display medium are arranged as the reference masks 15a. The reference data corresponding to the reference patterns is digitally stored and filed in a data base. The reference data is transferred from the data base to the spatial modulation elements, as needed, and various types of reference patterns are formed by the spatial modulation elements according to the reference data.

When the reference masks 15a are constituted as variable masks using the spatial modulation elements, necessary reference data can be prestored and filed in advance in the data base. Reference patterns corresponding to desired characters can be sequentially patterned by the spatial modulation elements, and pattern matching is established between the reference patterns and the bright line patterns corresponding to the characters to be discriminated.

In the above embodiment, the lightness polarity of the reference patterns 41 to 50 of the reference masks 15a is identical to that of the bright line patterns 31 to 40 displayed on the display 11. However, an opposite polarity may be employed. The optical patterns displayed on the display 11 are bright lines. However, a relatively simple optical pattern such as a light spot may be used in place of the bright line.

In the above embodiment, a total intensity of beams passing through the reference patterns 41 to 50 of one reference mask 15a is detected by the single photosensor 17a. However, an intensity of light passing through each individual reference pattern may be detected by an independent photosensor. In the above embodiment, a beam passing through the reference mask 15a is detected. However, a beam reflected by each reference mask or absorbed therein may be detected.

In the above embodiment, the outputs from the photosensors 17a are compared in the maximum value detector to perform image recognition. However, if levels of the outputs are discriminated by a class classification discriminator having a predetermined threshold value, characters to be discriminated can be classified into classes.

In the above embodiment, the areas 21 to 30 having the number corresponding to that of the vector components 1 to 10 are formed on the display 11, and the bright line patterns 31 to 40 corresponding to the vector components 1 to 10 are respectively displayed in the areas 21 to 30. However, a plurality of bright line patterns 31 to 40 may be simultaneously displayed in one of the areas 21 to 30. For example, in the embodiment shown in FIGS. 1 to 5, the areas 26 to 30 may be omitted, and each two patterns of the bright light patterns 31 to 40 may be displayed in each of the areas 21 to 25. In this case, the areas 56 to 60 of the reference masks are omitted, and the reference patterns 41 to 45 of the remaining ares 51 to 55 have a shape corresponding to the two bright line patterns.

In the above embodiment, a space is formed between the image formation lens 13a and the reference mask 15a. However, if the bright line pattern on the display 11 is formed at the end surface facing to the mask 15a, of the image formation lens 13a, the reference mask 15a can be brought into direct contact with the image formation lens 13a.

In the above embodiment, images to be recognized include alphanumeric symbols (i.e., letters and Arabic numerals), Japanese hiragana characters, Japanese katakana characters, and Chinese characters. In this case, characters may be printed characters of a Gothic type, a Ming type or the like, or handwritten characters. The present invention can also be applied to class classification or recognition of various types of information which can be represented by vectors, such as figures excluding characters, various types of voice, and technical information to be retrieved.

What is claimed is:

1. A vector discrimination apparatus for performing discrimination of a vector consisting of a plurality of vector components corresponding to features of predetermined information, comprising:

a display in which a plurality of displaying areas are respectively assigned in correspondence with said plurality of vector components on a screen, said display respectively displaying predetermined plurality of line-like or spot-like optical patterns at positions proportional to the rated value of each of said vector components in said plurality of displaying areas;

various types of reference masks in which a plurality of areas are respectively assigned in one-to-one correspondence with said plurality of displaying areas of said display, each of said various types of reference masks having a plurality of line-like or spot-like reference patterns respectively being formed by a gray scale in correspondence with said plurality of optical patterns in said plurality of displaying areas such that said plurality of reference patterns are matched with said predetermined plurality of optical patterns;

multiplier means for optically multiplying the predetermined optical patterns displayed on said display and for forming a plurality of pattern images each having a substantially identical shape in the vicinities of said various types of reference masks; and light detecting means for detecting beams guided respectively through said various types of reference masks by matching the pattern image with the reference pattern.

2. An apparatus according to claim 1, wherein the reference patterns formed on said reference masks have a predetermined shape which cannot be changed to another shape.

3. An apparatus according to claim 1, wherein said reference patterns formed on said reference masks are constituted by spatial modulation. elements, the reference patterns constituted by said spatial modulation elements being changed so as to correspond to reference data transferred from a data base.

4. An apparatus according to claim 1, wherein the predetermined information represents an image comprising a character and/or any other figure, and the features of the predetermined information are projection features extracted from the image.

5. An apparatus according to claims 1, wherein said multiplier comprises a projection lens spaced apart from a display screen of said display by a focal length of said projection lens, and a plurality of image formation lenses respectively corresponding to said various types of reference masks, said image formation lenses being adapted to form a plurality of optical pattern images each having a substantially identical shape in vicinities of said various types of reference masks upon reception of collimated light from said projection lens.

6. An apparatus according to claim 1, further comprising a plurality of condenser lenses for receiving and condensing beams from said various types of reference masks and for supplying these condensed beams to said light detecting means.

7. An apparatus according to claims 1, wherein said light detecting means comprises a photosensor.

* * * * *

UNITED STATES PATENT AND TRADEMARK OFFICE
CERTIFICATE OF CORRECTION

PATENT NO. : 4,790,024

DATED : Dec. 6, 1988

INVENTOR(S) : Norman A. Peppers, et al.

It is certified that error appears in the above-identified patent and that said Letters Patent is hereby corrected as shown below:

Col. 4, line 10, change "simolel" to -- simple --.

Signed and Sealed this

Twenty-fourth Day of October, 1989

Attest:

DONALD J. QUIGG

*Attesting Officer*      *Commissioner of Patents and Trademarks*